US007033507B2

(12) United States Patent
Zhuang

(10) Patent No.: US 7,033,507 B2
(45) Date of Patent: Apr. 25, 2006

(54) METHOD FOR REMOVING METALS FROM ACID MINE DRAINAGE

(75) Inventor: J. Ming Zhuang, Coquitlam (CA)

(73) Assignee: Noram Engineering and Constructors Ltd., Vancouver (CA)

( * ) Notice: Subject to any disclaimer, the term of this patent is extended or adjusted under 35 U.S.C. 154(b) by 0 days.

(21) Appl. No.: 10/294,665

(22) Filed: Nov. 15, 2002

(65) Prior Publication Data

US 2004/0094484 A1    May 20, 2004

(51) Int. Cl.
   *C02F 1/62* (2006.01)
(52) U.S. Cl. ............ 210/714; 210/667; 210/688; 210/721; 210/725; 210/727; 210/730; 210/912; 588/256
(58) Field of Classification Search ........ 210/665–667, 210/684, 688, 705, 714, 721, 725, 727, 728, 210/730, 738, 912–914; 588/256
   See application file for complete search history.

(56) References Cited

U.S. PATENT DOCUMENTS

| 3,617,559 | A | * | 11/1971 | Cywin .................. 210/713 |
| 4,253,958 | A | * | 3/1981 | Jodehl .................. 210/728 |
| 4,256,587 | A | * | 3/1981 | Carnahan et al. ........ 210/670 |
| 4,812,240 | A | * | 3/1989 | Watts .................. 210/639 |
| 4,933,087 | A |  | 6/1990 | Markham, Jr. et al. .... 210/726 |
| 5,298,168 | A | * | 3/1994 | Guess .................. 210/713 |
| 5,308,499 | A |  | 5/1994 | Dixon et al. ............ 210/705 |
| 5,427,691 | A | * | 6/1995 | Kuyucak et al. ........ 210/713 |
| 5,505,857 | A |  | 4/1996 | Misra et al. ............ 210/709 |
| 5,587,001 | A |  | 12/1996 | De Vries ............... 75/743 |
| 5,645,730 | A | * | 7/1997 | Malachosky et al. ..... 210/665 |
| 5,736,032 | A |  | 4/1998 | Cox et al. .............. 424/76.5 |
| 5,795,620 | A |  | 8/1998 | Iwinski ................. 427/136 |
| 5,846,179 | A |  | 12/1998 | Price .................. 588/261 |
| 6,086,847 | A |  | 7/2000 | Thompson .............. 423/669 |
| 6,143,692 | A |  | 11/2000 | Sanjay et al. ........... 502/401 |
| 6,196,765 | B1 |  | 3/2001 | Harrington ............. 405/128 |
| 6,274,045 | B1 | * | 8/2001 | Kreisler ................ 210/710 |

FOREIGN PATENT DOCUMENTS

| FR | 2 731 421 A | 9/1996 |
| WO | WO 02 16272 A | 2/2002 |

OTHER PUBLICATIONS

XP-002269333, Zhuang, Walsh, Lam, "A New Technology for the Treatment of Mercury Contaminated Water and Soils", Oct. 16-18, 2002, pp. 1-10, Banff, Alberta, CA.

* cited by examiner

*Primary Examiner*—Peter A. Hruskoci
(74) *Attorney, Agent, or Firm*—Oyen Wiggs Green & Mutala LLP

(57) ABSTRACT

A method for removing metal contaminants from acidic mine wastewater using lignin derivatives, such as lignosulfonates and kraft lignin, an alkali coagulant, such as a lime compound, and an alkaline composition for increasing the pH. The lignin derivatives are dispersed in the wastewater and the coagulant is added, increasing the pH to about 4.5–8.5 and causing the formation of a floc. The alkaline composition is then added to bring the pH to about 9 to 10, causing the further formation of a floc. Optionally, air oxidation is carried out, reducing the pH to about 8.1–8.6. Optionally, a ferric or ferrous salt may also be added. The flocs comprise metal-lignin colloids, metal hydroxides and metal salts. The flocs coagulate to form a sludge. Optionally, fly ash or diatomaceous earth may be added to increase the density and stability of the sludge. The sludge that is formed contains the metals and is separated from the treated water by filtration.

34 Claims, No Drawings

METHOD FOR REMOVING METALS FROM ACID MINE DRAINAGE

TECHNICAL FIELD

This invention pertains to the treatment of water to remove metal contaminants therefrom. More particularly, it pertains to a process for the removal of metals from acidic mine wastewaters, using lignin derivatives.

BACKGROUND OF THE INVENTION

Acid rock drainage (ARD) is a natural process that occurs when sulfur-containing compounds in rock are exposed to air and water. When this process occurs in the context of mining operations, where sulfur-containing rocks are exposed as a result of open pit or underground mining, the process is referred to as acid mine drainage (AMD). The process produces acidic waters as a result of the oxidation of the minerals pyrite ($FeS_2$) and pyrotite (FeS) and other sulfur-containing compounds, generating sulfuric acid. The oxidation is increased by the bioactivity of oxidizing bacteria, in particular Thiobacillus and Ferrobacillus. The pH of the acidic waters is typically about 2.1 to 3.5. This low pH causes the water to leach metals from the rock and soils in contact therewith. Other mine wastewaters resulting from the operation of a mine, whether an underground or an open pit mine, including the water used in the operating process of the mine and from mill clean-up, are also often highly acidic. All such wastewaters, including ARD and AMD, are collectively referred to in this specification as "acidic mine wastewaters."

The contamination of water supplies by the metals in acidic mine wastewaters is a serious environmental concern. For example, the metals dissolved in such waters may kill fish and other aquatic life, and may pose human health hazards when they find their way into drinking water supplies.

Various processes have been proposed for reducing the metal content of wastewater. It is known that flocculating agents are of use in such processes. For example, U.S. Pat. No. 5,720,886 (Iwinski) discloses a process for removing metals from mine wastewaters that uses an anionic polymer and a flocculent.

One known method for treating acid mine drainage is the high density sludge (HDS) process. In this process, an excess amount of lime is applied to neutralize the acidity of the water and raise the pH to about 9–10. An appropriate flocculent is then added and the mixture is transferred to a clarifier, from which clean effluent is decanted from a sludge. The HDS process uses large amounts of lime, is very time-consuming, and requires the handling of a large quantity of sludge and further treatment of the sludge to stabilize it. The process requires expensive equipment to handle lime slurry. It frequently requires modification for removal of various metals to meet local environmental regulations.

It is known that a variety of compounds form complexes with metal ions, providing the potential to remove the metal ions from the compositions they contaminate. The capacity of humic and fulvic acids to complex metal ions is well established. For example, U.S. Pat. No. 6,143,692 (Sanjay et al.) discloses a process for removing metals from water using humic acid.

Kraft lignin and lignosulfonates are two classes of lignin derivatives available commercially. They are produced as by-products of the sulfate and sulfite pulping processes respectively. Lignosulfonates have been used in processes for the removal of various organic contaminants from water. Such processes are disclosed, for example, in U.S. Pat. No. 5,736,032 (Cox et al.), U.S. Pat. No. 4,933,087 (Markham, Jr. et al.) and U.S. Pat. No. 5,308,499 (Dixon et al.).

Lignosulfonates and kraft lignin contain an abundance of oxygen-containing functional groups (such as phenolic, hydroxyl, enolic, ether, carbonyl, and $SO_3H$ structures of various types), which are capable of forming lignin-metal complexes with high stability through ionic and covalent chemical bonding. It would be desirable to be able to use these plentiful and inexpensive lignin derivatives in processes for the effective removal of metal contaminants from acidic mine wastewater.

SUMMARY OF INVENTION

According to one embodiment of the invention, there is provided a method for removing metal contaminants from acidic mine wastewater. Lignin derivatives, such as lignosulfonates or kraft lignin, are dispersed in the contaminated water. An alkali coagulant, such as a lime compound (for example, hydrated lime ($Ca(OH)_2$), quick lime (CaO) or limestone ($CaCO_3$)), is added to partially neutralize the acidity of the water and raise the pH to about 4.5 to 8.5. The pH is then adjusted to about 9 to 10 by the addition of an alkaline composition, such as caustic soda or soda ash or additional lime. Optionally, air oxidation is then carried out, reducing the pH to about 8.0–8.6. Flocs of metal-lignin, metal hydroxides and salts are formed and coagulate to form sludge, producing a clear effluent. The sludge is then separated from the treated water, preferably by filtration. Optionally, a minimum amount of a ferric or ferrous salt may be added for further removal of dissolved metals. Optionally, fly ash or diatomaceous earth can be added.

DETAILED DESCRIPTION OF THE PREFERRED EMBODIMENTS

The methods of the invention can be used to treat any acidic mine wastewater, as defined above. The metals that can be removed from acidic mine wastewater by the methods of the invention are heavy metals, including cadmium, cobalt, copper, manganese, nickel, lead and zinc, as well as lighter metals, such as aluminum.

The invention provides a new method of treating acidic mine wastewater. Lignin derivatives are dispersed in the metal-contaminated water, causing the formation of metal-lignin complexes. One or more alkali coagulants, preferably lime compounds, are added, with agitation, to raise the pH to a pH in the range of 4.5 to 8.5, and preferably in the range of 6.0 to 7.5. This causes the formation of a metal-containing floc, as some metal ions, in particular ferric and aluminum, form hydroxide flocs. The step of adding the lignin derivatives in the wastewater can be carried out either before or after the step of adding the alkali coagulant. An alkaline composition, such as caustic soda, soda ash, or additional lime, is then dispersed in this mixture to increase the pH, preferably to a pH in the range of 9–10 and more preferably 9.3–9.6. At this pH, most of the remaining metals form flocs comprising insoluble hydroxides and salts. Preferably, after raising the pH to 9–10, air oxidation of the mixture is carried out, causing a reduction of the pH to about 8.0–8.6, allowing the removal of both aluminum and manganese by precipitation. The flocs of metal-lignin complexes, metal hydroxides and salts are then separated out from a clear filtrate. This is done by letting them coagulate and settle, forming a sludge which is then removed.

The lignin derivatives used in the method of the invention are preferably lignosulfonates, kraft lignin and sulfonated kraft lignin salts, and mixtures thereof. The lignosulfonates include ammonium, sodium, potassium, magnesium and calcium lignosulfonates. The sulfonated kraft lignin salts include the ammonium, sodium, potassium, magnesium and calcium salts. All these lignin derivatives are available as by-products of pulp mill processes. The quantity of lignin derivatives that is added to the wastewater is preferably about 0.002 to 0.05 grams per liter of water being treated. In the practice of the invention, the lignin derivatives chelate metal ions, promoting flocculation and coagulation of the metals and increasing the settling rate of the sludge. They also enhance the retention of the metals in the sludge against leaching. The addition of the lignin derivatives to the acidic mine wastewater is preferably done as a first step in the method, prior to neutralizing the water with lime. However, it can instead be done after the step of neutralization.

The alkali coagulants used are preferably lime compounds, including hydrated lime ($Ca(OH)_2$), quicklime (CaO), limestone ($CaCO_3$), dolomitic lime ($CaO.MgO$), dolomitic hydrated lime ($Ca(OH)_2.MgO$), dolomitic limestone ($CaCO_3.MgCO_3$) and mixtures thereof. The amount of lime compound added is preferably about 0.1 to 0.8 grams (as CaO) per liter of water, and more preferably 0.15 to 0.5 grams (as CaO) per liter of water. The lime compounds act as a coagulant, causing the flocculation of metal-lignin colloids. The amount of lime that is required in the process can be estimated by the acidity of the water being treated.

The alkaline composition used for raising the pH to about 9 to 10 is preferably soda ash ($Na_2CO_3$), caustic soda (NaOH), or the alkaline hydroxides, including the calcium, potassium, magnesium and lithium hydroxides. The use of soda ash assists the precipitation of some metals, such as cadmium and manganese, as carbonate salts. The pH can also be raised using additional lime, though this is not preferred because it increases the amount of sludge that is formed. Ammonia can be used but is not preferred due to its handling requirements.

The quantity of alkaline composition added depends on the final pH desired, which can differ for different metal contaminants and the alkali demand of the acidic mine wastewater. It has been found that the stability of the sludge that is produced by the process of the invention (i.e. its resistance to leaching of the metals) is greater when the final pH is in the range of 8.0 to 8.6, than at a higher pH of about 9 to 10.

After the pH of the solution has been raised to 9–10, preferably, the optional step of oxidation of the reaction mixture is carried out. This reduces the pH to about 8.0–8.6 and preferably 8.3–8.5. The oxidation can be air oxidation, which can be done by bubbling air through the solution. Performing air oxidation for a period of about 30–60 minutes is preferred. This step is particularly useful in effecting the removal of both aluminum and manganese compounds by precipitation.

The efficiency of air oxidization is affected by many factors including the pH, temperature, air quality and mixing, and the levels of $Fe^{2+}$ and $Mn^{2+}$ and other components in the solution. Under agitation and air bubbling, the pH value of the solution is continuously reduced, indicating the formation of insoluble hydroxides. The initial pH when beginning air oxidation is about 9–10. The final pH to which the solution is brought, within the range of 8.0–8.6, depends on the properties of the metals dissolved in the water and the desired levels of metals in the treated effluent.

As an optional step, a ferric or ferrous salt is added to the reaction mixture in order to promote the removal of dissolved metals by the formation of flocs. Suitable ferric salts include ferric chloride and ferric sulfate. Suitable ferrous salts include ferrous chloride and sulfate. Preferably, about 0.01 to 0.12 grams of ferric chloride per liter of water is used. Although a ferric salt can be used where the process does not include the step of air oxidation, it is preferred that the process would include such step. When a ferric salt is used, air oxidation is carried out until the pH is reduced only to about 8.7–8.9. Then, the ferric salt is added, causing a reduction of the pH to the desired final pH of 8.0–8.6, preferably 8.3–8.5. A ferrous salt can also be used, though in such case the salt is added before or during the step of air oxidation so that the ferrous ions are oxidized to ferric ions in the solution. It will accordingly be understood that, where the process includes the preferred step of air oxidation, the reduction in the pH can be effected either solely by air oxidation or by means of air oxidation down to a pH of 8.7–8.9 and then by the addition of a ferric salt to bring the pH to 8.0–8.6.

As a further optional step, fly ash or diatomaceous earth is added to the reaction mixture to accelerate the settling rate of the floc and increase the density of the sludge, thus assisting its removal, and to stabilize the sludge. The quantity of fly ash or diatomaceous earth that is used is not more than about 0.3 g per liter of water, to avoid the production of an excessive amount of sludge. Preferably, the amount of fly ash or diatomaceous earth is in the range of 5% to 10% by weight of the weight of the alkali coagulant. Preferably, the fly ash is class C or class F and most preferably class C, which has a higher calcium content. The addition of fly ash or diatomaceous earth can be done in conjunction with the addition of the other materials, i.e. with the lignin derivatives, the lime or the caustic soda/soda ash.

The sludge that is formed by the flocculation comprises largely calcium compounds, such as $Ca(OH)_2$, $CaSO_4$, $CaCO_3$, calcium-lignin, and co-precipitates with other metals. The metal-containing sludge formed is separated from the treated water by any convenient means. Preferably, it is removed by filtering the treated water and sludge, for example in a filter press, to separate the sludge, which contains the complexed metals, from a clear filtrate, having a greatly reduced metal content. Other sludge-removal means include decanting, centrifuging and using a clarifier. The mass of sludge depends principally on the amount of dissolved metals in the water and the amount of lime that is used.

The metals in the sludge are present as inorganic and organic complexes, adsorbed on inorganic and organic colloids, or incorporated within biological materials. The sludge is stable with respect to retaining the metals, due primarily to the capability of lignin derivatives to form stable metal complexes with metals. Long-term stability of the sludge is promoted by use of fly ash or diatomaceous earth, as described above.

In a variant of the method described above, rather than allowing the floc to coagulate and settle as a sludge, once the floc forms it is separated from the solution, for example, by filtration, leaving a clear filtrate. In this method, the step of allowing the floc to coagulate and settle is not required. The floc is filtered out directly, using a filter that is sufficiently fine to remove floc comprising small particles.

The following procedures in accordance with the invention were carried out on two samples of acidic mine wastewater having the metals content shown in Table 2. Sample #1 was yellow-reddish water taken from acid mine drainage, containing some red powders and having a pH of 3.1. Sample #2 was clear yellowish water taken from acid mine drainage having a pH of 3.1. The processes were carried out at room temperature and with mixing to disperse or dissolve the ingredients.

EXAMPLE 1

Under agitation, 0.040 g of sodium lignosulfonates was rapidly dissolved in one liter of Sample #1 acidic mine wastewater. The pH was unchanged by the addition of the lignosulfonates. Then, 0.383 g hydrated lime was added. After about 15 minutes the pH had risen to about 7.4. Then 0.208 g fly ash was added to the water, raising the pH about 7.7. Then the pH was adjusted with caustic soda (0.33 g, 50% by wt.) to 9.5. Air oxidation with air bubbling through the water was carried out for 70 minutes reducing the pH to 8.4. The water was then transferred to a 1-L lmhaff settling cone. It took about 11 minutes to complete flocculation and coagulation to form 200 ml sludge at the bottom. The sludge was separated by filtration through a 1.6 µm-pore filterpaper. The mass of dried sludge was 0.69 g. The dissolved metals content of the decanted water was determined by ICP method. The process data are shown in Table 1 and metal content data in Table 2.

EXAMPLE 2

Under agitation, 0.352 g of hydrated lime was added to one liter of Sample #2 acidic mine wastewater. After about 15 minutes the pH had increased from 3.1 to about 5.7. 0.041 g of soda ash was added, which raised the pH of the water to 6.2. Then 0.031 g sodium lignosulfonates was rapidly dissolved, which increased the pH of the water to 6.3. The pH was then raised with caustic soda (0.486 g, 50% by wt.) to 9.4. Air oxidation with air bubbling through water was carried out for about 75 minutes, reducing the pH to 8.3. The water was then transferred to a 1-L lmhaff settling cone. It took about 15 minutes to complete flocculation and coagulation to form 200 ml sludge at bottom. The sludge was separated by the filtration through a 1.6 µm-pore filterpaper. The mass of dried sludge was 0.45 g. The dissolved metals of decanted water was determined by the ICP method. The test data are shown in Tables 1 and 2.

EXAMPLE 3

Under agitation, 0.037 g of sodium lignosulfonates was rapidly dissolved in one liter of Sample #2 acidic mine wastewater. The pH remained at its initial value. 0.361 g hydrated lime was added, causing the pH to increase to about 6.0. 0.189 g fly ash was added into the water, which raised the pH to about 6.1. The pH was then raised with caustic soda (0.468 g, 50% by wt.) to 9.3. Air oxidation with air bubbling through the water was carried out for about 20 minutes, reducing the pH to 8.7. 0.056 g $FeCl_3$ (41% by wt.) solution was injected into the water, reducing the pH to 8.3. The water was then transferred to a 1-L lmhaff settling cone. It took about 11 minutes for flocculation and coagulation to form 300 ml sludge at the bottom. The sludge was separated by filtration though a 1.6 µm-pore filterpaper. The mass of dried sludge was 0.74 g. The dissolved metals of decanted water was determined by ICP method. The test data are shown in Tables 1 and 2.

EXAMPLE 4

Under agitation, 0.039 g of sodium lignosulfonates was rapidly dissolved in one liter of Sample #2 acidic mine wastewater. The pH remained at its initial value of 3.1. Then 0.391 g hydrated lime was added. After about 15 minutes the pH had increased to about 7.2. The pH was then raised with caustic soda (0.374 g, 50% by wt.) to 9.6. Air oxidation with air bubbling through the water was carried out, reducing the pH to 8.8. 0.070 g $FeCl_3$ (41% by wt.) solution was injected into the water, causing a reduction of pH to 8.3. The water was then transferred to a 1-L lmhaff settling cone. It took about 12 minutes for flocculation and coagulation to form 300 ml sludge at the bottom. The sludge was separated by filtration through a 1.6 µm-pore filterpaper. The mass of dried sludge was 0.55 g. The dissolved metals content of the decanted water was determined by ICP method. The test data are shown in Tables 1 and 2.

TABLE 1

| | Process Data | | | |
|---|---|---|---|---|
| | AMW Sample #1 | | AMW Sample #2 | |
| Reagent | Example 1 | Example 2 | Example 3 | Example 4 |
| Lignosulfonates, mg/L | 40 | 31 | 37 | 39 |
| Hydrated lime, mg/L | 383 | 352 | 361 | 391 |
| Soda ash, mg/L | 0 | 41 | 0 | 0 |
| Fly ash, mg/L | 208 | 0 | 189 | 0 |
| Caustic soda (50%), mg/L | 330 | 486 | 468 | 374 |
| Air Oxidization, minutes | 70 | 75 | 20 | 30 |
| $FeCl_3$ (41%), mg/L | 0 | 0 | 56 | 70 |
| Final pH = | 8.4 | 8.3 | 8.3 | 8.3 |
| Dried Sludge (g/L) = | 0.69 | 0.45 | 0.74 | 0.55 |

TABLE 2

| | Metal Data | | | | | | | | | |
|---|---|---|---|---|---|---|---|---|---|---|
| | AMW Sample #1 (mg/L) | | | AMW Sample #2 (mg/L) | | | | | | |
| | Example 1 | | | Example 2 | | | Example 3 | | Example 4 | |
| Metals | Before Treatment | After Treatment | Reduction (%) | Before Treatment | After Treatment | Reduction (%) | After Treatment | Reduction (%) | After Treatment | Reduction (%) |
| Aluminum | 56.9 | 1.59 | 97.2 | 43.7 | 1.59 | 96.4 | 1.07 | 97.6 | 0.58 | 98.7 |
| Cadmium | 0.1 | 0.003 | 97 | 0.098 | 0.003 | 96.9 | 0.003 | 96.9 | 0.005 | 94.9 |
| Copper | 41 | 0 | 100 | 28.7 | 0.04 | 99.9 | 0.03 | 99.9 | 0.03 | 99.9 |
| Iron | 17 | 0.02 | 99.9 | 8.8 | <0.02 | 100 | 0.02 | 99.8 | <0.02 | 100 |
| Manganese | 7.11 | 0.257 | 96.4 | 6.125 | 0.459 | 92.5 | 0.424 | 93.1 | 0.338 | 94.5 |

TABLE 2-continued

Metal Data

| | AMW Sample #1 (mg/L) | | | AMW Sample #2 (mg/L) | | | | | | |
|---|---|---|---|---|---|---|---|---|---|---|
| | Example 1 | | | Example 2 | | | Example 3 | | Example 4 | |
| Metals | Before Treatment | After Treatment | Reduction (%) | Before Treatment | After Treatment | Reduction (%) | After Treatment | Reduction (%) | After Treatment | Reduction (%) |
| Zinc | 19.1 | 0.02 | 99.9 | 18.7 | 0.02 | 99.9 | 0.019 | 99.9 | 0.032 | 99.8 |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for removing metals from metal-containing acidic mine wastewater, consisting essentially of the steps of:
    (a) dispersing lignin derivatives in said wastewater;
    (b) dispersing an alkali coagulant in said wastewater, thereby increasing the pH of said wastewater to about 4.5 to 8.5;
    (c) after steps (a) and (b), dispersing an alkaline composition in the wastewater, thereby increasing the pH of said wastewater to about 9 to 10 and causing the formation of a floc; and
    (d) separating metal-containing flocs formed in said wastewater from said wastewater.

2. A method according to claim 1 wherein said metals comprise one or more of aluminum, cadmium, cobalt copper, manganese, nickel, lead and zinc.

3. A method according to claim 1 wherein said lignin derivatives comprise lignosulfonates.

4. A method according to claim 3 wherein said lignosulfonates comprise one or more of:
    (i) ammonium lignosulfonates;
    (ii) calcium lignosulfonates;
    (iii) sodium lignosulfonates;
    (iv) potassium lignosulfonates; and
    (v) magnesium lignosulfonates.

5. A method according to claim 1 wherein said lignin derivatives comprise sulfonated kraft lignin salts.

6. A method according to claim 5 wherein said sulfonated kraft lignin salts comprise sulfonated kraft lignin salts of ammonium, calcium, sodium, potassium or magnesium.

7. A method according to claim 1 wherein said lignin derivatives comprise kraft lignin.

8. A method according to claim 1 wherein the amount of said lignin derivatives is in the range of 0.0002 to 0.05 grams per liter of said wastewater.

9. A method according to claim 1 wherein said alkali coagulant is a lime compound.

10. A method according to claim 9 wherein the amount of said lime compound is about 0.1 to 0.8 g (as CaO) per liter of said wastewater.

11. A method according to claim 9 wherein the amount of said lime compound is about 0.15 to 0.5 g (as CaO) per liter of said wastewater.

12. A method according to claim 9 wherein said lime compound comprises hydrated lime, quick lime, limestone, dolomitic lime, dolomitic hydrated lime, dolomitic limestone, or mixtures thereof.

13. A method according to claim 1 wherein the pH is increased to a pH in the range of 6.0 to 7.5 in step (b).

14. A method according to claim 1 wherein the pH is increased to a pH in the range of 9.3 to 9.6 in step (c).

15. A method according to claim 1 wherein said alkaline composition comprises caustic soda, soda ash or soluble hydroxides or a mixture thereof.

16. A method according to claim 1 wherein said alkaline composition comprises a lime compound.

17. A method according to claim 1 wherein said step of separating comprises coagulating said flocs to form a sludge and separating said sludge from an aqueous filtrate.

18. A method according to claim 1 wherein said step of separating said sludge is done by filtration.

19. A method for removing metals from metal-containing acidic mine wastewater, consisting essentially of the steps of:
    (a) dispersing lignin derivatives in said wastewater;
    (b) dispersing an alkali coagulant in said wastewater, thereby increasing the pH of said wastewater to about 4.5 to 8.5;
    (c) after steps (a) and (b), dispersing an alkaline composition in the wastewater, thereby increasing the pH of said wastewater to about 9 to 10 and causing the formation of a floc;
    (d) after step (c), causing oxidation of said wastewater; and
    (e) separating metal-containing flocs formed in said wastewater from said wastewater.

20. A method according to claim 19 wherein said oxidation is done by introducing air into said wastewater.

21. A method according to claim 20 wherein said oxidation reduces the pH to about 8.0–8.6.

22. A method according to claim 20 wherein said oxidation reduces the pH to about 8.3–8.5.

23. A method for removing metals from metal-containing acidic mine wastewater, consisting essentially of the steps of:
    (a) dispersing lignin derivatives in said wastewater;
    (b) dispersing an alkali coagulant in said wastewater, thereby increasing the pH of said wastewater to about 4.5 to 8.5;
    (c) after steps (a) and (b), dispersing an alkaline composition in the wastewater, thereby increasing the pH of said wastewater to about 9 to 10 and causing the formation of a floc;
    (d) adding fly ash or diatomaceous earth to said wastewater; and (e) separating metal-containing flocs formed in said wastewater from said wastewater.

24. A method according to claim 23 wherein the amount of said fly ash or diatomaceous earth is 0.5 grams or less per liter of said wastewater.

25. A method according to claim 23 wherein the amount of said fly ash or diatomaceous earth is in the range of 5 to 10 percent by weight of the weight of said alkali coagulant.

26. A method according to claim 23 wherein said step of adding fly ash or diatomaceous earth is carried out at the same time as step (a).

27. A method according to claim 23 wherein said step of adding fly ash or diatomaceous earth is carried out at the same time as step (b).

28. A method according to claim 23 wherein said step of adding fly ash or diatomaceous earth is carried out at the same time as step (c).

29. A method according to claim 23 wherein said fly ash is one of class C or class F fly ash.

30. A method for removing metals from metal-containing acidic mine wastewater, consisting essentially of the steps of:
(a) dispersing lignin derivatives in said wastewater;
(b) dispersing an alkali coagulant in said wastewater, thereby increasing the pH of said wastewater to about 4.5 to 8.5;
(c) after steps (a) and (b), dispersing an alkaline composition in the wastewater, thereby increasing the pH of said wastewater to about 9 to 10 and causing the formation of a floc;
(d) after step (c), causing oxidation of said wastewater;
(e) adding a ferric or ferrous salt; and
(f) separating metal-containing flocs formed in said wastewater from said wastewater.

31. A method according to claim 30 consisting essentially of wherein the step of adding a ferric salt to said water is done after said step of oxidation.

32. A method for removing metals from metal-containing acidic mine wastewater, consisting essentially of the steps of:
(a) dispersing lignin derivatives in said wastewater;
(b) dispersing an alkali coagulant in said wastewater, thereby increasing the pH of said wastewater to about 4.5 to 8.5;
(c) after steps (a) and (b), dispensing an alkaline composition in the wastewater, thereby increasing the pH of said wastewater to about 9 to 10 and causing the formation of a floc;
(d) after step (c), causing oxidation of said wastewater, wherein said oxidation reduces the pH of said water to about 8.7–8.9;
(e) adding a ferric salt to said water after said step of air oxidation, reducing the pH to 8.0–8.6; and
(f) separating metal-containing flocs formed in said wastewater from said wastewater.

33. A method according to claim 31 wherein said ferric salt is ferric chloride and the amount of ferric chloride added is in the range of 0.01 to 0.12 g per liter of wastewater.

34. A method for removing metals from metal-containing acidic mine wastewater, consisting essentially of the steps of:
(a) dispersing lignin derivatives in said wastewater;
(b) dispersing an alkali coagulant in said wastewater, thereby increasing the pH of said wastewater to about 4.5 to 8.5;
(c) after steps (a) and (b), dispensing an alkaline composition in the wastewater, thereby increasing the pH of said wastewater to about 9 to 10 and causing the formation of a floc;
(d) adding a ferric salt; and
(e) separating metal-containing flocs formed in said wastewater from said wastewater.

* * * * *